United States Patent
Huang et al.

(10) Patent No.: US 6,904,066 B2
(45) Date of Patent: Jun. 7, 2005

(54) OPTICAL PARAMETRIC OSCILLATOR WITH DISTRIBUTED FEEDBACK GRATING OR DISTRIBUTING BRAGG REFLECTOR

(75) Inventors: Yen-Chieh Huang, No. 101, Sec. 2, Kwang-Fu Rd., Hsinchu (TW), 300; Jow-Tsong Shy, Hsinchu (TW); An-Chung Chiang, Hsinchu (TW); Yen-Yin Lin, Hsinchu (TW)

(73) Assignee: Yen-Chieh Huang, Hsinchu (TW)

( * ) Notice: Subject to any disclaimer, the term of this patent is extended or adjusted under 35 U.S.C. 154(b) by 0 days.

(21) Appl. No.: 10/293,620

(22) Filed: Nov. 13, 2002

(65) Prior Publication Data

US 2003/0123497 A1 Jul. 3, 2003

Related U.S. Application Data

(60) Provisional application No. 60/338,167, filed on Nov. 13, 2001.

(51) Int. Cl.[7] .................................................. H01S 3/10
(52) U.S. Cl. ............................................................ 372/21
(58) Field of Search .......................... 372/20–22, 102; 359/326, 330

(56) References Cited

U.S. PATENT DOCUMENTS

| | | | | |
|---|---|---|---|---|
| 5,036,220 A | * | 7/1991 | Byer et al. ................... 372/22 |
| 5,249,250 A | * | 9/1993 | Yamada et al. ............. 385/122 |
| 5,311,352 A | * | 5/1994 | Bierlein et al. ............. 359/326 |
| 5,615,041 A | * | 3/1997 | Field et al. ................. 359/326 |
| 5,768,302 A | * | 6/1998 | Wallace et al. ............... 372/21 |
| 5,787,102 A | * | 7/1998 | Alexander et al. ............ 372/22 |
| 5,796,902 A | * | 8/1998 | Bhat et al. ................... 372/22 |
| 5,986,798 A | * | 11/1999 | Karlsson et al. ............ 359/326 |
| 6,167,067 A | * | 12/2000 | Meyer et al. .................. 372/21 |
| 6,215,800 B1 | * | 4/2001 | Komine ........................ 372/22 |
| H1965 H | * | 6/2001 | Burns et al. .................. 372/22 |
| 6,301,273 B1 | * | 10/2001 | Sanders et al. ............... 372/22 |
| 6,304,366 B1 | * | 10/2001 | Scalora et al. ................ 372/21 |
| 2001/0028029 A1 | * | 10/2001 | Scalora et al. ............. 250/216 |
| 2002/0126370 A1 | * | 9/2002 | Broderick et al. .......... 359/332 |
| 2002/0176454 A1 | * | 11/2002 | Arbore et al. ................ 372/20 |

* cited by examiner

*Primary Examiner*—MinSun Oh Harvey
*Assistant Examiner*—James Menefee
(74) *Attorney, Agent, or Firm*—Volpe & Koenig, P.C.

(57) ABSTRACT

A simple and effective coherent radiation device generates laser-like radiation from an optical parametric oscillator (OPO) that is formed by a dielectric-modulation structure in a nonlinear optical material. The nonlinear optical material used in the OPO can be a birefringence phase-matched material or a quasi-phase-matched material.

33 Claims, 12 Drawing Sheets

OPTICAL PARAMETRIC OSCILLATOR WITH DISTRIBUTED FEEDBACK GRATING OR DISTRIBUTING BRAGG REFLECTOR

CROSS REFERENCE TO RELATED APPLICATION

Applicants claim priority to U.S. Provisional Patent Application No. 60/338,167, filed Nov. 13, 2001, which is incorporated by reference as if fully set forth.

FIELD OF THE INVENTION

The present invention relates to a coherent radiation device for generating coherent radiations from an optical parametric oscillator (OPO) formed by periodic, or aperidic, or cascading dielectric modulation in or nearby a nonlinear optical gain medium.

BACKGROUND OF THE INVENTION

An optical structure discussed in the present invention is a dielectric or refractive-index modulation structure in a nonlinear optical material resonantly reflecting an optical wavelength satisfying the parametric phase matching condition and the Bragg condition $\lambda_m = 2n\Lambda_g/m$, where $n$ is the refractive index seen by the optical wave in the material, $\Lambda_g$ is the spatial wavelength of the dielectric modulation, and m is a positive integer. The wavelength $\lambda_m$ is called the Bragg wavelength of order m. When the dielectric modulation is incorporated into the two ends of a laser gain medium to replace the resonator mirrors of a laser, the laser is often called a distributed Bragg reflector (DBR) laser. A DBR laser has the advantage of simplicity, because the two physical resonator mirrors are replaced by two Bragg reflectors monolithically fabricated to a laser gain medium. In a laser, a Bragg reflector can be fabricated over the entire length of a laser gain medium. The distributed optical feedback from the dielectric modulation establishes laser oscillation near the Bragg wavelength. This type of laser is termed as distributed-feedback (DFB) laser. Since different longitudinal modes in a DFB laser have different laser gain, a DFB laser has the advantage of simplicity and single-longitudinal-mode operation.

The DBR and DFB structures have been widely used in diode lasers for a variety of applications. However, the wavelength of a diode laser is limited by the energy bandgap of a semiconductor material, and cannot be varied with an arbitrary choice of the DBR or DFB dielectric-modulation period.

One way to tune a laser wavelength is to use a nonlinear optical material. Recently, advance in quasi-phase-matched (QPM) nonlinear optics (concept originally described by J. A. Armstrong et al. in *Phys. Rev.* 127 (1962) 1918.) has greatly enhanced the nonlinear conversion efficiency and extended the wavelength tuning range. For instance, solid-state laser pumped optical parametric generation (OPG) and oscillation from periodically-poled lithium niobate (PPLN, a kind of QPM crystal) has provided efficient and widely tunable laser sources (Myers et al. *Journal of Optical Society of America B,* Vol. 12 (1995) pp. 2102–2116). However, OPG starts amplification from vacuum noises and produces a broadband radiation. In the mid-infrared wavelengths, the spectral width from PPLN OPG may exceed several nanometers. To obtain efficient narrow-line laser-like radiations, QPM optical parametric oscillation is a popular means. A conventional linear-cavity optical parametric oscillator (OPO) may take advantage of the high finesse from its resonator and generate multi-longitudinal-mode laser-like radiation with a narrow linewidth in each mode. To obtain a single longitudinal mode from an OPO, one usually has to adopt a more complicated resonator design (Bosenberg et al., *Applied Physics Letters,* Vol. 61 (1992) pp. 378–389). Yet if one could implement a DBR or DFB structure into a nonlinear optical material for optical parametric oscillation, such an OPO is monolithic and can generate the Bragg wavelength in the parametric bandwidth. In particular, a DFB structure in the nonlinear optical medium permits single-frequency oscillation at a chosen wavelength (Yen-Chieh Huang and Yuan-Yao Lin, *Journal of Optical Society of America B,* Vol. 21 (2004) 777–790). A single-frequency coherent radiation source is very much desired in numerous laser applications.

It is therefore attempted by the applicant to deal with the above situation encountered with the prior art.

SUMMARY OF THE INVENTION

It is therefore an object of the present invention to propose a simple and effective coherent radiation device for generating laser-like radiation from an OPO formed by a dielectric-modulation structure in a nonlinear optical material. The nonlinear optical material used in the OPO of the present invention can be a birefringence phase-matched crystal or a quasi-phase-matched crystal.

It is therefore another object of the present invention to propose a simple and effective coherent radiation device for generating a narrow-spectral-width laser-like radiation from an OPO formed by a DFB or DBR structure in a nonlinear optical material. The nonlinear optical material used in the OPO of the present invention can be a birefringence phase-matched crystal or a quasi-phase-matched crystal.

It is an aspect of the present invention to propose a coherent radiation device for generating narrow-spectral-width laser-like radiation from an OPO formed by a nonlinear optical element having a photorefractive DFB structure for oscillating an electromagnetic wave at one of the parametric mixing wavelengths.

It is another aspect of the present invention to propose a coherent radiation device for generating narrow-spectral-width laser-like radiation from an OPO formed by a nonlinear optical element having a photorefractive DBR structure for oscillating an electromagnetic wave at one of the parametric mixing wavelengths.

Preferably, the DFB or the DBR structure reflects the electromagnetic wave near the first-order Bragg wavelength $\lambda = h2n\Lambda_g$, where $\Lambda_g$ is a period of the periodic dielectric modulation and n is the effective refractive index seen by the scattered wave in the medium, so that the OPO device with the DFB or DBR structure oscillates at the wavelength $\lambda$. The Bragg wavelength $\lambda$ can be any of the nonlinear mixing wavelengths.

Preferably, the nonlinear optical element is a second-order nonlinear optical crystal.

Preferably, the OPO has a built-in photorefractive or electro-optic or acousto-optic DFB structure in a bulk nonlinear crystal.

Preferably, the OPO has a built-in photorefractive or electro-optic or acousto-optic DFB structure in a waveguide nonlinear crystal.

Preferably, the OPO has a built-in photorefractive or electro-optic or acousto-optic DBR structure in a bulk nonlinear crystal.

Preferably, the OPO has a built-in photorefractive or electro-optic or acousto-optic DBR structure in a waveguide nonlinear crystal.

Preferably, the nonlinear optical crystal is a birefringence phase-matched crystal.

Preferably, the nonlinear optical crystal is a quasi-phase-matched crystal.

Preferably, the nonlinear optical crystal is a photorefractive nonlinear optical crystal such as lithium niobate or lithium tantalate or impurity-doped same.

It is further an aspect of the present invention to propose a coherent radiation device for generating narrow-spectral-width laser from an OPO formed by a nonlinear optical element having a photorefractive DFB or DBR structure wherein the photorefractive index modulation is fabricated by shining an optical beam through a photomask atop a photorefractive nonlinear optical element.

Preferably, the photomask has a spatial transmission period matching the Bragg condition desirable for the OPO operation.

Preferably, the optical beam is an optical write beam whose wavelength and intensity have the effect of inducing dielectric modulation in the nonlinear optical material.

Preferably, the optical beam is at the visible or UV wavelengths.

Preferably, the nonlinear optical element is a nonlinear optical crystal having the second-order susceptibility.

It is an additional aspect of the present invention to propose a coherent radiation device for generating narrow-spectral-width laser-like radiation from an OPO that is formed by a nonlinear optical element having a photorefractive DFB or DBR structure wherein the photorefractive index modulation is fabricated by an interferometric photorefractive writing scheme, with which two crossed laser beams with a proper crossing angle introduce spatial optical intensity modulation in the nonlinear optical element through the interference effect.

Preferably, the periodicity of the interference fringes matches the Bragg condition desirable for the OPO operation.

It is another aspect of the present invention to propose a coherent radiation device for generating narrow-spectral-width laser-like radiation from an OPO that is formed by a nonlinear optical element having an electro-optic DFB grating, wherein an electric field is applied to the electro-optic nonlinear optical element for spatially varying the refractive index in the laser propagation direction. The periodicity of the dielectric modulation matches the Bragg condition desirable for the OPO operation.

It is another aspect of the present invention to propose a coherent radiation device for generating narrow-spectral-width laser-like radiation from an OPO that is formed by a nonlinear optical element having an electro-optic DBR grating, wherein an electric field is applied to the electro-optic nonlinear optical element for spatially varying the refractive index in the laser propagation direction. The periodicity of the dielectric modulation matches the Bragg condition desirable for the OPO operation.

Preferably, the amount of index change, in its simplified form, is given by $$\Delta n = \frac{1}{2} r n^3 E,$$

where r is an electro-optic coefficient of the crystal, n is the refractive index without the applied voltage, and E is an electric field inside the crystal.

It is another aspect of the present invention to propose a coherent radiation device for generating narrow-spectral-width laser-like radiation from an OPO that is formed by a DFB structure atop a nonlinear optical waveguide, with which the distributed feedback from the wave near the waveguide surface is sufficient for starting optical parametric oscillation.

Preferably, the DFB structure is fabricated by using schemes such as material etching, or thin film coating, micro-lithography, and a combination of the same.

It is another aspect of the present invention to propose a coherent radiation device for generating narrow-spectral-width laser-like radiation from an OPO that is formed by a DBR structure atop a nonlinear optical waveguide, with which the distributed feedback from the wave near the waveguide surface is sufficient for starting optical parametric oscillation.

Preferably, the DBR structure is fabricated by using schemes such as material etching, or thin film coating, micro-lithography, and a combination of the same.

It is another aspect of the present invention to propose a coherent radiation device for generating narrow-spectral-width laser-like radiation from an OPO that is formed by a DFB or DBR structure inside a nonlinear optical waveguide, with which the optical feedback from the Bragg scattered waves inside the waveguide is sufficient for starting optical parametric oscillation.

Preferably, the DFB or DBR structure is of photorefractive type mentioned above.

Preferably, the DFB or DBR structure is of electro-optic type mentioned above.

The present invention may best be understood through the following description with reference to the accompanying drawings, in which:

DETAILED DESCRIPTION OF THE PREFERRED EMBODIMENT

Although this invention is susceptible to embodiments of many different forms, some preferred embodiments would be described and illustrated in details hereinafter. The present disclosure exemplifies the principle of the invention and is not to be considered a limitation to the broader aspects of the invention to the particular embodiment as described.

Figure 1:
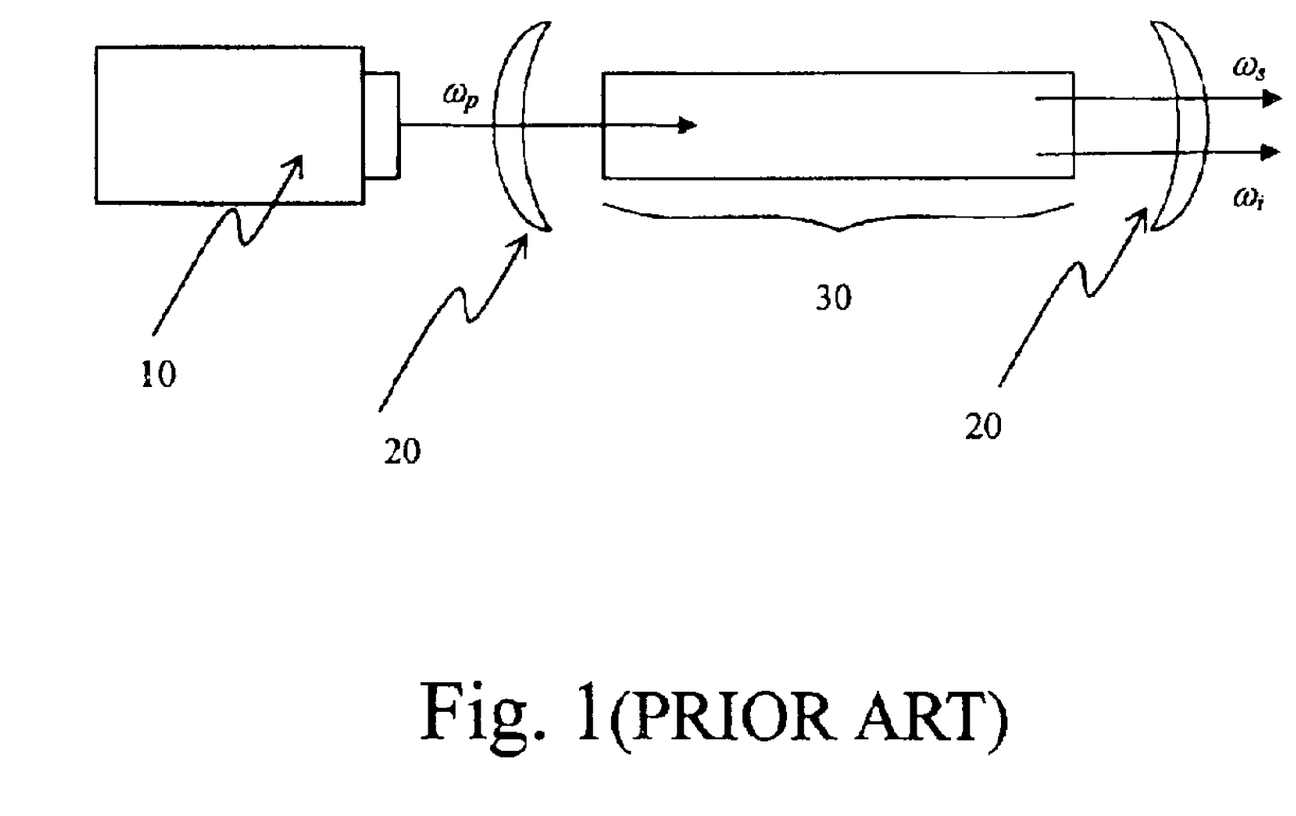
FIG. 1 is a schematic cross-sectional view of an OPO, as practiced in the prior art.

This invention relies on the optical feedback from dielectric modulation in a nonlinear optical material to establish optical parametric oscillation of an OPO. FIG. 1 illustrates the prior art where a pump laser 10 pumps a nonlinear optical element 30 in a laser resonator formed by two reflecting mirrors 20. In an optical parametric process, the pump photon with angular frequency $\omega_p$ generates two photons with angular frequencies $\omega_s$ and $\omega_i$ according to the relationship $$\omega_s + \omega_i = \omega_p.$$

Usually the high frequency photon is called the signal and the low frequency one is called the idler. The resonator mirrors 20 may oscillate the signal or the idler photon or both.

Figure 2:
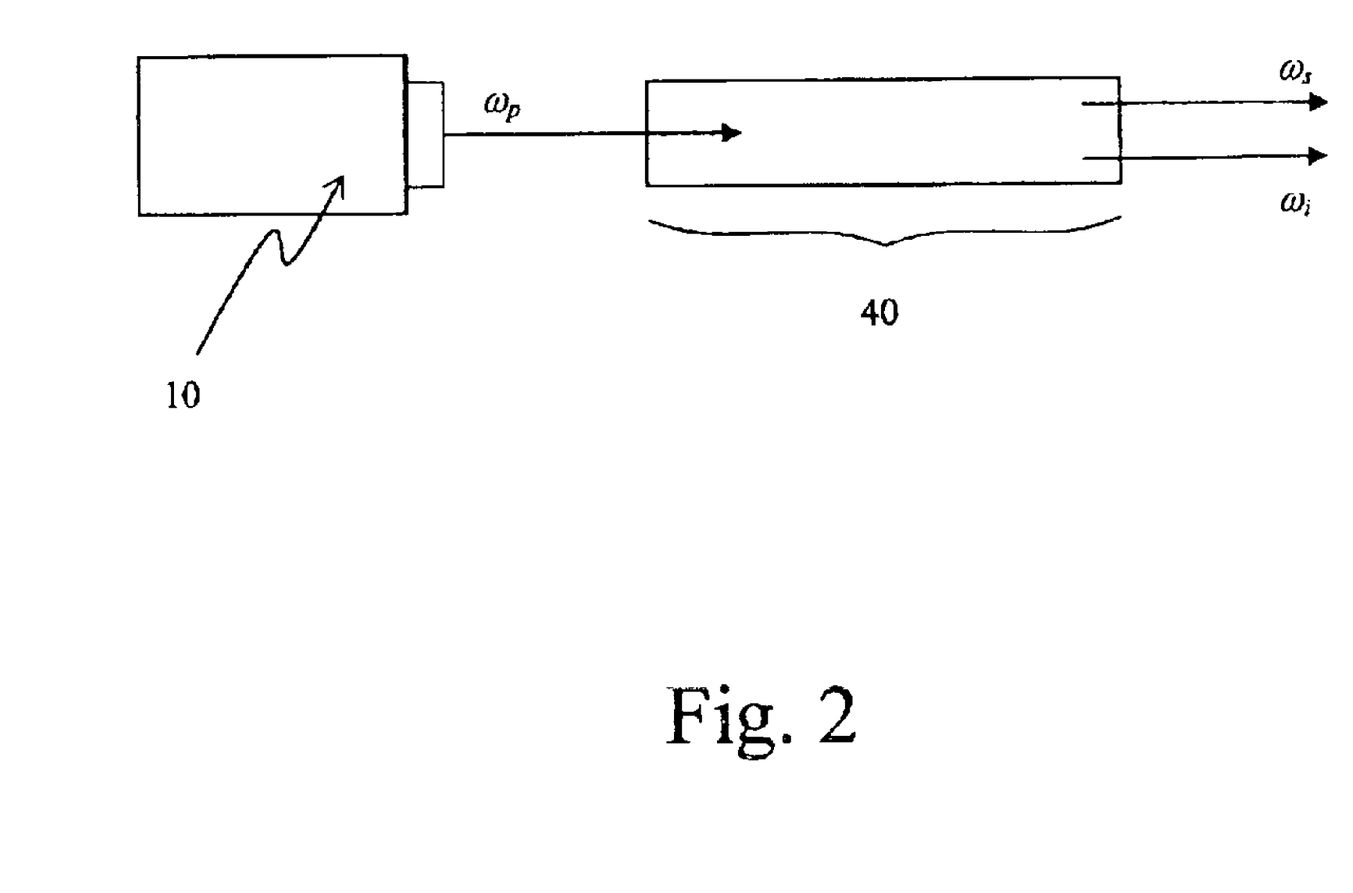
FIG. 2 is a schematic illustration of an embodiment of the OPO of the present invention.

According to the present invention, the resonator mirrors in the prior art are replaced by a DFB or DBR structure in the nonlinear optical element, as illustrated in FIG. 2. The nonlinear optical element with a built-in DFB or DBR structure 40 can be any of the devices 41, 42, 43, 44, 45, 46 in FIGS. 3–8.

Figure 3:
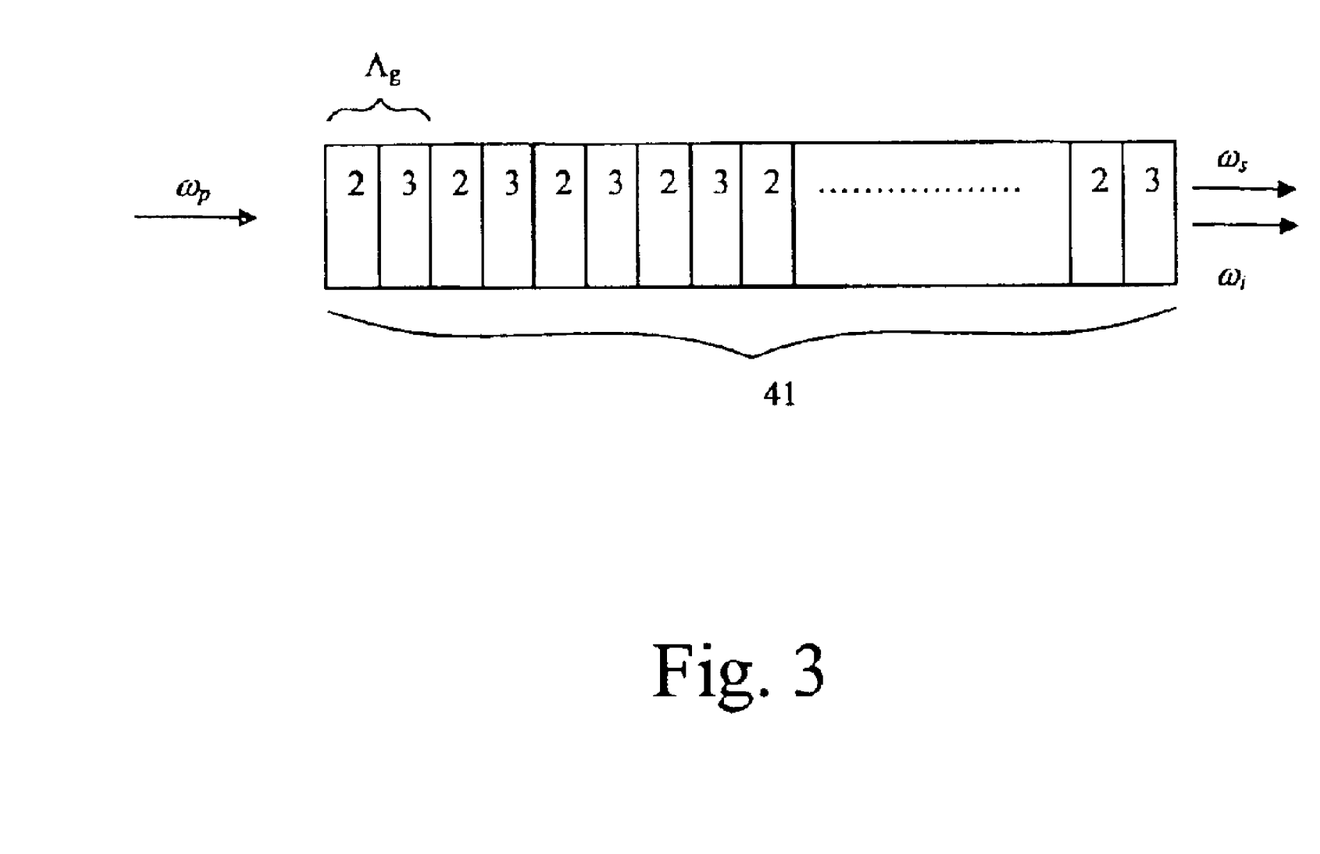
FIG. 3 is a schematic view of a DFB structure in a nonlinear optical bulk material used in the OPO of the present invention.

FIG. 3 is a schematic view of a DFB structure in a nonlinear optical bulk material used in the OPO of the present invention. There exists a periodic refractive index modulation, designated by the repeating labeling 2 and 3, over the whole length of the nonlinear optical bulk material. The refractive-index modulation period of order m, $\Lambda_{g,m}$, satisfies the Bragg condition $$\Lambda_{g,m} = \frac{m\lambda_s}{2n_s}, \text{ or } \Lambda_{g,m} = \frac{m\lambda_i}{2n_i},$$

where $\lambda_s$ and $\lambda_i$ are the signal and idler wavelengths, respectively, and $n_s$ and $n_i$ are the effective refractive indices seen by the signal and idler photon, respectively.

Figure 4:
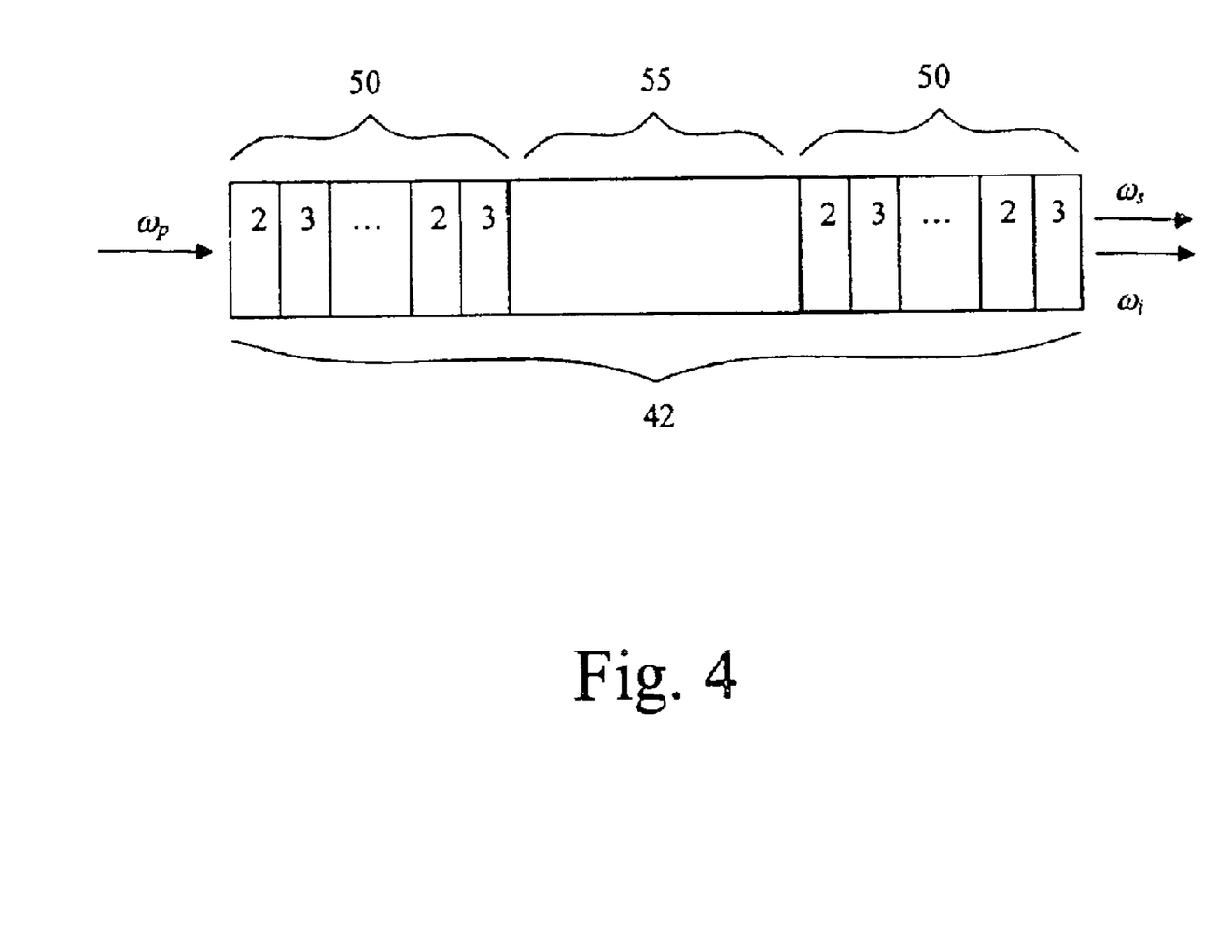
FIG. 4 is a schematic view of the DBR structure in a nonlinear optical bulk material used in the OPO of the present invention.

FIG. 4 is a schematic view of the DBR structure in a nonlinear optical bulk material used in the OPO of the present invention. There exist two sections of periodic dielectric modulation 50 at the two ends of a nonlinear optical bulk material to serve as the reflecting mirrors in the OPO of the present invention. A section of a nonlinear optical material 55 between the two index-modulation sections is left unchanged for optical frequency conversion.

Figure 5:
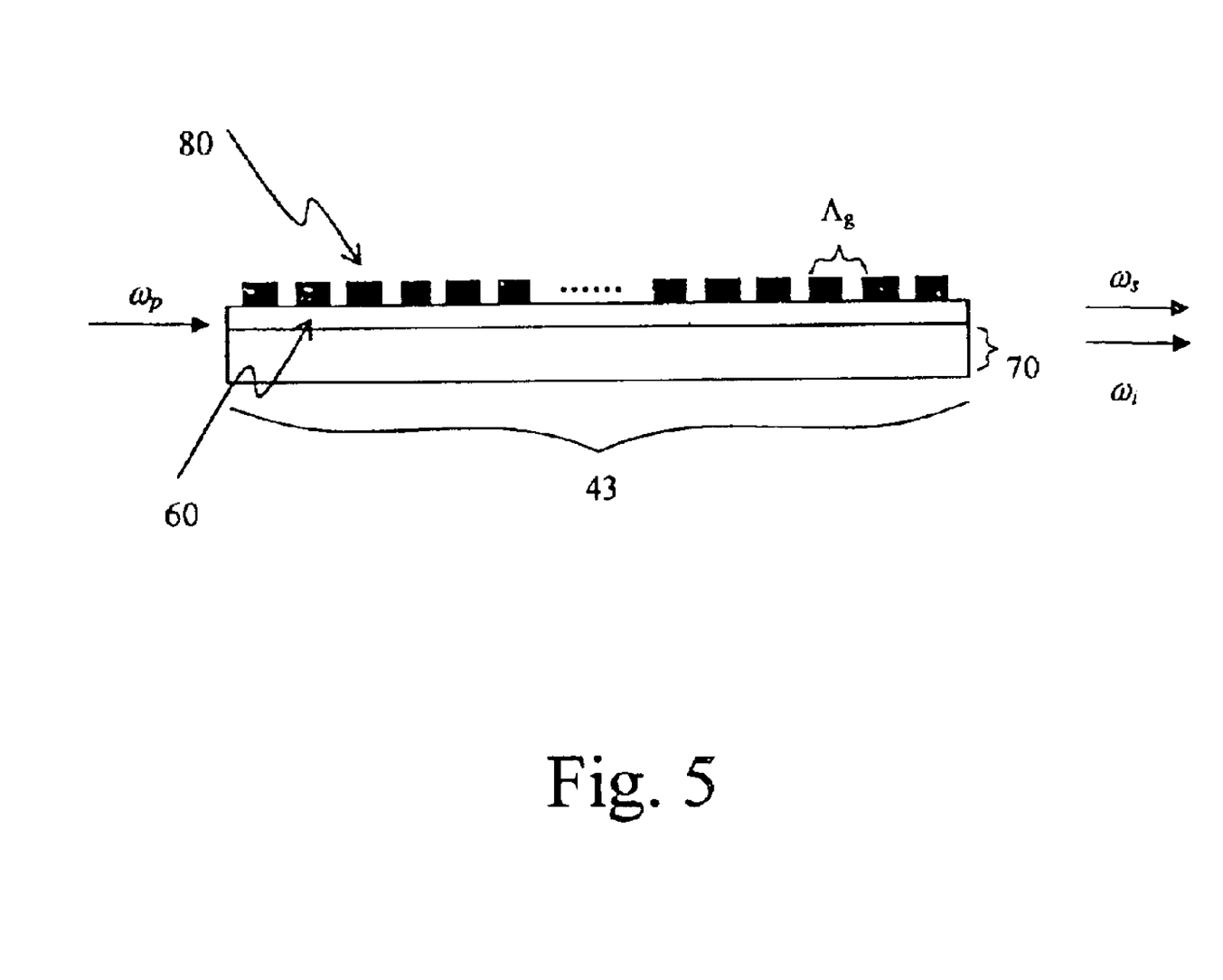
FIG. 5 is a schematic view of a DFB structure in a nonlinear optical waveguide used in the OPO of the present invention.

FIG. 5 is a schematic view of a DFB structure in a nonlinear optical waveguide used in the OPO of the present invention. There exists a corrugated periodic structure 80, the DFB structure, atop a nonlinear optical waveguide 60 over the whole device length. The DFB structure reflects the optical wave near the waveguide surface to establish optical parametric oscillation inside the waveguide. The nonlinear optical waveguide is fabricated on the surface of a suitable material substrate 70. For example, a nonlinear optical waveguide can be fabricated on a lithium niobate substrate by the so-called annealed proton-exchanged method (M. L. Bortz et al. *Optics Letters* vol. 16 No. 23 (1991) pp. 1844–1846). Another embodiment of the DFB structure is to have the periodic refractive index change embedded inside the waveguide. The embedded DFB structure thus provides distributed optical feedbacks to the optical wave inside the waveguide.

Figure 6:
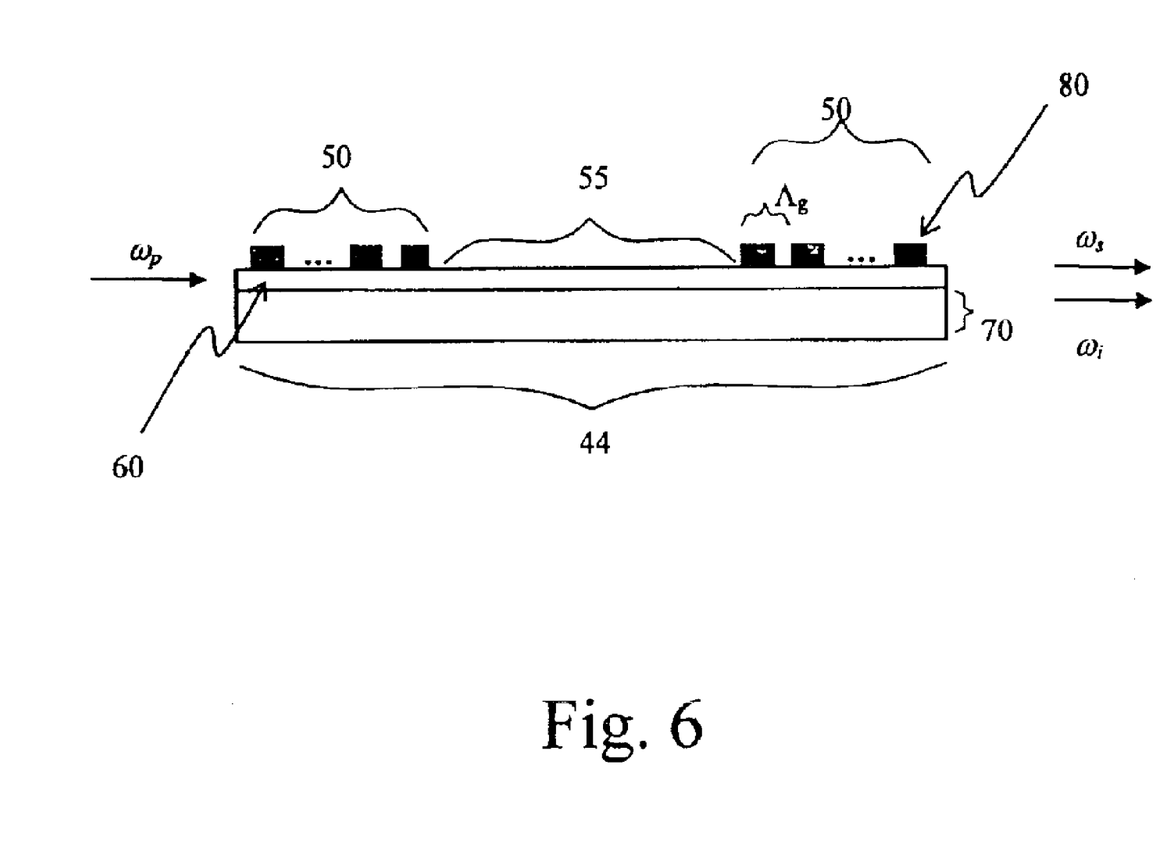
FIG. 6 is a schematic view of the DBR structure in a nonlinear optical waveguide used in the OPO of the present invention.

FIG. 6 is a schematic view of a DBR structure in a nonlinear optical waveguide used in the OPO of the present invention. Instead of having periodic dielectric modulation over the whole length of the device, two sections of the dielectric modulation 50, a DBR structure, are fabricated atop or inside a nonlinear optical waveguide at the two ends of the device. The nonlinear optical waveguide 55 between the DBR reflectors is left untouched and serves as the gain section of the OPO of the present invention.

Figure 7:
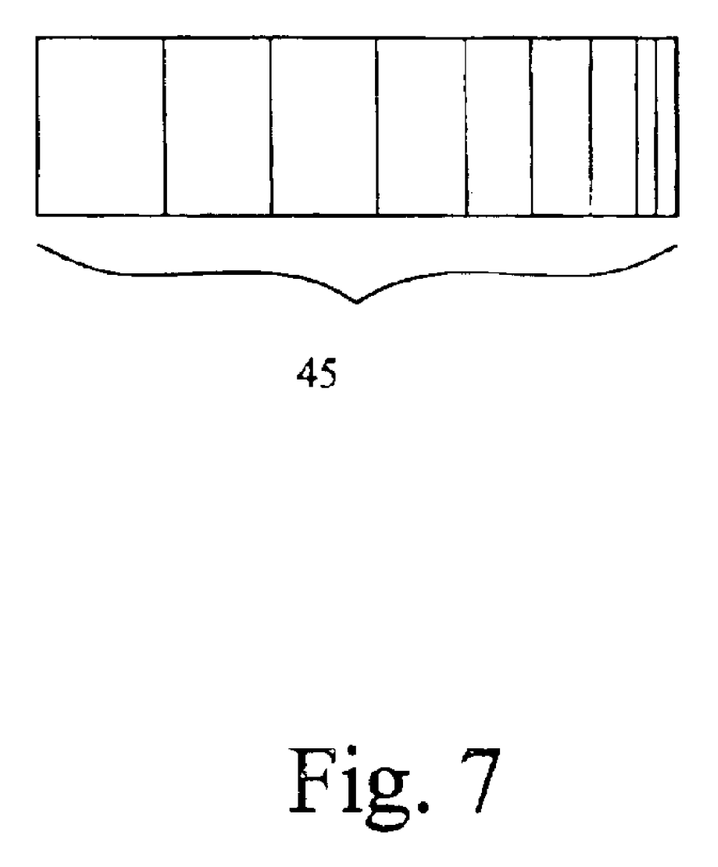
FIG. 7 is a schematic view of a chirped Bragg diffraction grating as another preferred embodiment of the DFB or DBR structure for the nonlinear optical material used in the present invention.

FIG. 7 is a schematic view of a chirped dielectric modulation as another preferred embodiment of the DFB or DBR structure for the nonlinear optical element used in the present invention. A general Bragg reflector may have an arbitrary dielectric modulation in space, which reflects the optical wavelengths matching the spatial Fourier components of the reflector through the Bragg condition. Therefore the reflection spectrum of a dielectric-modulation structure can be mapped to the Fourier transform spectrum of the dielectric-modulation structure. For example, a chirped dielectric-modulation structure has a broad Fourier transform spectrum and therefore is suitable for broadband OPO operation.

Figure 8:
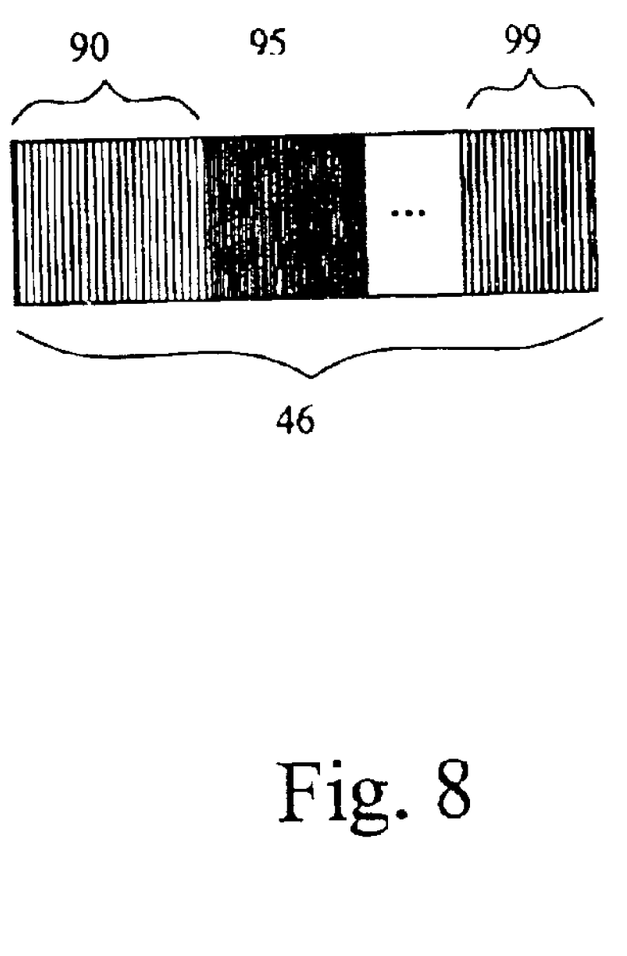
FIG. 8 is a schematic view of a cascading dielectric-modulation structure as another preferred embodiment of the DFB or DBR structure for the nonlinear optical material used in the present invention.

FIG. 8 is a schematic view of a cascading dielectric-modulation section as another preferred embodiment of the DFB or DBR structure for the nonlinear optical element used in the present invention. The cascading dielectric-modulation section is suitable for generating several laser wavelengths from the OPO simultaneously as each section (90, 95, . . . , 99), having a different index-modulation period, oscillates a different wavelength in the OPO. As long as all the Bragg wavelengths in the cascading dielectric-modulation section are within the OPO bandwidth, the OPO of the present invention may generate a plural number of laser wavelengths simultaneously.

When a photorefractive nonlinear optical element is used as the gain medium of an OPO, it is possible to write photorefractive index modulation in the bulk or waveguide element. In a photorefractive material, space charges are established inside the material with a spatial modulation matching the intensity of a write beam. Coupled through the electro-optical effect, the refractive index of the nonlinear optical material is spatially modulated according to the spatially intensity variation in the write beam. For example, a spatially intensity modulated write beam can be produced by using a photomask atop the photorefractive nonlinear optical element with a desired spatial transmission period in the photomask. Alternatively, a phase mask can be installed under the write beam to generate an interference-intensity period equal to the desired index-modulation period. Furthermore, one can simply cross two laser beams with an appropriate angle to form a periodic interference intensity in the photorefractive nonlinear optical crystal and create photorefractive index-modulation.

When an electro-optic nonlinear crystal is used as the gain medium of an OPO, it is possible to implement electro-optic index modulation in the bulk or waveguide crystal. One may initially fabricate micro-electrodes on the nonlinear crystal with an electrode distribution matching the Bragg structure by using the micro-lithographic techniques. When a voltage is applied to the micro-electrodes, the electric field strength in the crystal induces refractive index change through the electro-optic effect to form electro-optic index modulation in the crystal. For example, if a 0.5 mm thick, z-cut periodically poled lithium niobate (PPLN) crystal is used for a quasi-phase-matched OPO, one may fabricate the periodic micro-electrodes to the crystallographic ±z surface and apply a voltage to induce the index modulation. According to the equation $$\Delta n = \frac{1}{2} r_{33} n^3 E_z,$$

the index change can be on the order of $\Delta_n = 10^{-5}$ when a voltage of ~100 Volts is applied to the micro-electrodes.

If a nonlinear optical waveguide is used for an OPO, the dielectric modulation can be implemented to the waveguide surface by using the lithographic etching process. The micro-etching process often used in the semiconductor processing forms a corrugated index modulation on the nonlinear waveguide. Like a DFB or DBR diode laser, the Bragg reflection of the wave from the surface index modulation is sufficient to establish the optical parametric oscillation. Alternatively, the index modulation can be formed by thin-film coating and lithographic etching techniques atop the nonlinear waveguide. For example, one may initially coat a layer of material thin film to the nonlinear waveguide and apply chemical or plasma etching to the thin film to obtain surface index modulation on the nonlinear waveguide.

EXPERIMENT

Since lithium niobate is a photorefractive material, it is possible to write a photorefractive DFB or DBR structure in a PPLN crystal. In particular, with the OPO mirrors replaced by a photorefractive DFB structure in a PPLN crystal, the design of a single-frequency OPO can be greatly simplified. In this experiment (A. C. Chiang, Y. Y. Lin, T. D. Wang, Y. C. Huang, and J. T. Shy, *Optics Letters* Vol. 27 No. 20 (2002) pp. 1815–1817), we show two PPLN DFB optical parametric oscillators with photorefractive DFB gratings in PPLN crystals. One photorefractive DFB grating was fabricated by illuminating ultraviolet (UV) light through a photomask atop a PPLN crystal, and the other was written into the PPLN crystal by interfering laser beams at 532-nm wavelength.

Figure 9:
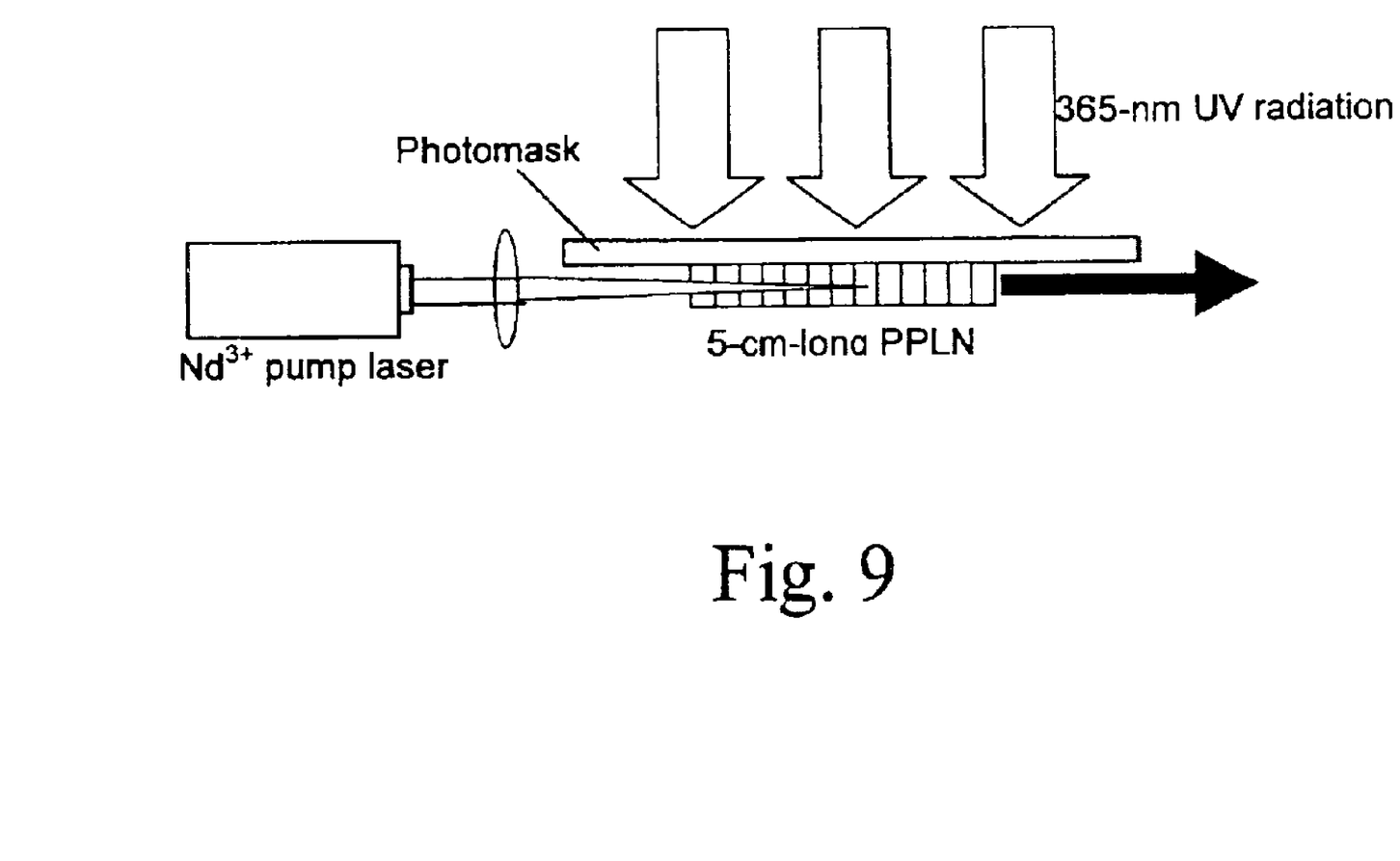
FIG. 9 is the schematic of a photorefractive DFB OPO by using a UV photomask to produce the dielectric modulation in a photorefractive nonlinear optical crystal.

In the UV-photomask scheme shown in FIG. 9, incoherent UV radiation from a 20W, mercury lamp was illuminated onto a photomask with a 1-$\mu$m period, 50%-duty-cycle chromium grating mask. The mercury lamp was covered with a UV filter that is transparent to the 365-nm mercury line. With the UV filter, the incident intensity on the photomask was about 0.3 W/cm². The photomask was in contact with a 4-cm long, 0.5-mm thick, 28-$\mu$m-period, uncoated and end-polished PPLN crystal with the chromium grating vector aligned with the QPM grating vector in the crystallographic x direction. While illuminating UV radiation through the photomask, the PPLN crystal temperature was raised from 20° C. to 160° C. within 3 minutes and decreased from 160° C. to 20° C. over a 2-hour duration. The UV-induced photorefractive DFB grating was thus fixed in the PPLN. The 1-$\mu$m DFB grating period allows the oscillation of the 4.085-$\mu$m idler wavelength in the 1064-nm pumped PPLN OPO at 115.4° C. temperature. The corresponding signal wavelength is 1438.8 nm. Pumping the DFB PPLN with a 9-$\mu$J/pulse, 730-ps pulsewidth passively Q-switched Nd:YAG laser, we observed that the DFB OPO signal was generated at 1438.8 nm. The signal spectra were measured by using an InGaAs detector after a ½-m grating monochromator. The resolution of the monochromator was 3 Å with a 10-$\mu$m slit opening and a 300 lines/mm infrared grating. The 730-ps pump pulse length is comparable to the round-trip time in the 4-cm long PPLN crystal, and does not establish parametric oscillation from the uncoated PPLN end faces.

Figure 10:
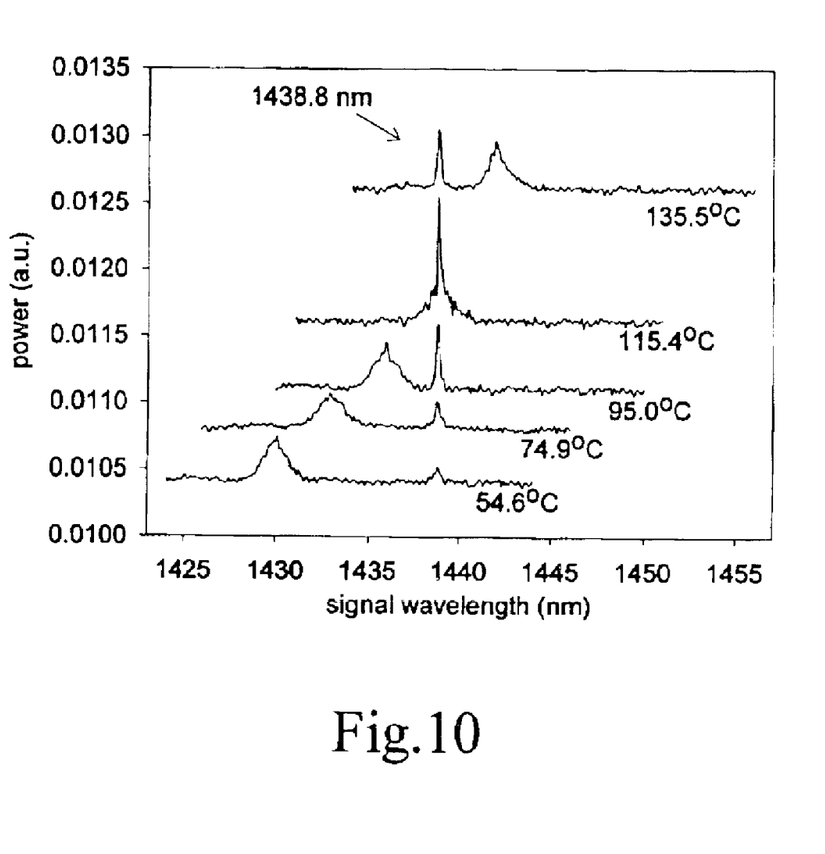
FIG. 10 is the measured signal spectra from the photorefractive DFB OPO in FIG. 9.

FIG. 10 shows the OPO and the OPG signal spectra at different temperatures. It is evident from FIG. 10 that, although the OPG wavelength was shifted by temperature, the OPO signal wavelength remained unchanged due to the photorefractive DFB grating in the PPLN. At 115.4° C., the OPG wavelength overlapped the OPO signal wavelength, and the conversion was significantly enhanced by a factor of 3. The measured spectral width of the DFB OPO signal was 3 Å, and that of the OPG signal was 3 nm. At the pump energy of 6.75 $\mu$J, the output signal energy was 1 $\mu$J, corresponding to 15% signal conversion efficiency.

With the DFB grating vector in the crystallographic x direction, one would expect that the DFB structure results from the space charge field in the x direction $E_x$. However, the $E_x$-induced refractive index change for a z-polarized pump field is a second-order effect in lithium niobate, given by $$\Delta n_z = n_0^2 n_e^3 (r_{51} E_x)^2 / 2, \qquad (1)$$

where $n_0$ and $n_e \approx 2.2$ are the ordinary and extraordinary refractive indices respectively, and $r_{51} \approx 32$ pm/V is the electro-optic coefficient of lithium niobate. In the steady-state, thermal-diffusion-dominated, and nondepleted-carrier approximation, the space charge field is about the order of $E_x \approx 2\pi k_B T/(\Lambda q) \approx 10^5$ V/m, where $k_B$ is Boltzmann's constant, q is the electron charge, T≈400 K is the crystal temperature, and $\Lambda$=1 $\mu$m is the DFB grating period. Although this space charge field rotates the index ellipsoid of lithium niobate and slightly depolarizes the incident optical field, the index change seen by the laser is merely $\Delta n_z \approx 10^{-9}$, according to Eq. (1). However due to UV diffraction through the photomask, the intensity of the write beam spatially varies along the crystallographic z direction. This suggests that the space charge distribution also varies in the z direction. With the photorefractive charges varying along z, a z-component space charge field $E_z$ may induce the first-order refractive-index change in PPLN, given by $$\Delta n_z = n_e^3 r_{33} E_z / 2 \approx 10^{-5}, \qquad (2)$$

wherein we have used $r_{33}$=31 pm/V and $E_z \leq E_x \approx 10^5$ V/m for calculation. This amount of refractive-index change is much larger than that calculated from Eq. (1). The distributed optical feedback in the PPLN OPO was similar to that in a DFB diode laser with a corrugated grating near the surface of the gain medium. Nonetheless, the corrugated photorefractive DFB structure was able to provide sufficient optical feedbacks and produce a signal spectral linewidth reaching the limit of the monochromator resolution.

Figures 10, 11:
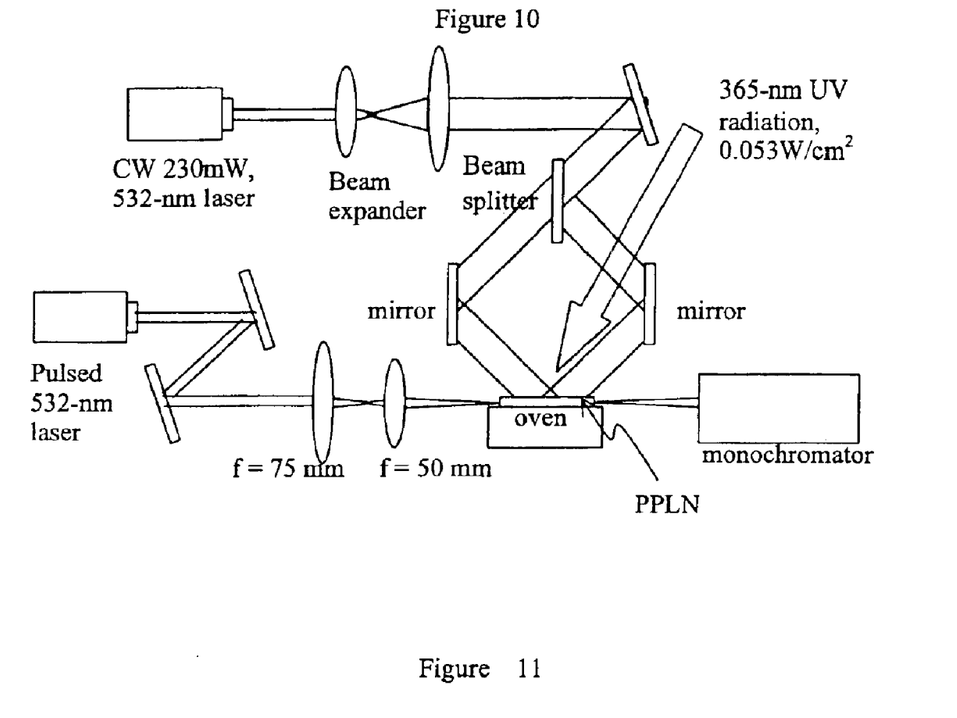
FIG. 11 is the schematic of the two-photon photorefractive DFB OPO by using crossed laser beams to write the dielectric modulation in a photorefractive nonlinear optical crystal.

As a second preferred embodiment, the photorefractive DFB structure can be written in lithium niobate by using laser-beam interference, as shown in FIG. 11. In the experiment, we used a cylindrical lens to shape the spherical laser beam into an elliptical beam with approximately 1:50 axis ratio. Then we split and recombined the 200-mW, 532-nm laser with a 34° angle to produce 0.913-$\mu$m-period interference fringes on a 5-cm long, 0.5-mm thick, 11-$\mu$m-period, uncoated and end-polished PPLN crystal. The peak intensity of the interfering laser beam was about 0.5 W/cm². The 0.913-$\mu$m-period DFB grating was designed to oscillate the 3.778-$\mu$m OPO idler wavelength in the 532-nm pumped PPLN at 82° C. The pump laser was a passively Q-switched, frequency-doubled Nd:YAG laser, producing 2-μJ pulse energy in the PPLN crystal with 6.59-kHz repetition rate and 430-ps pulse width. The interfering 532-nm laser beams produced a periodic space charge field in the x direction in the bulk of the PPLN crystal. Although the temperature dependent OPG signal near 620 nm was clearly seen in our experiment, we did not observe any evidence of DFB OPO due to the trivial photorefractive index change given by Eq. (1).

Figure 12:
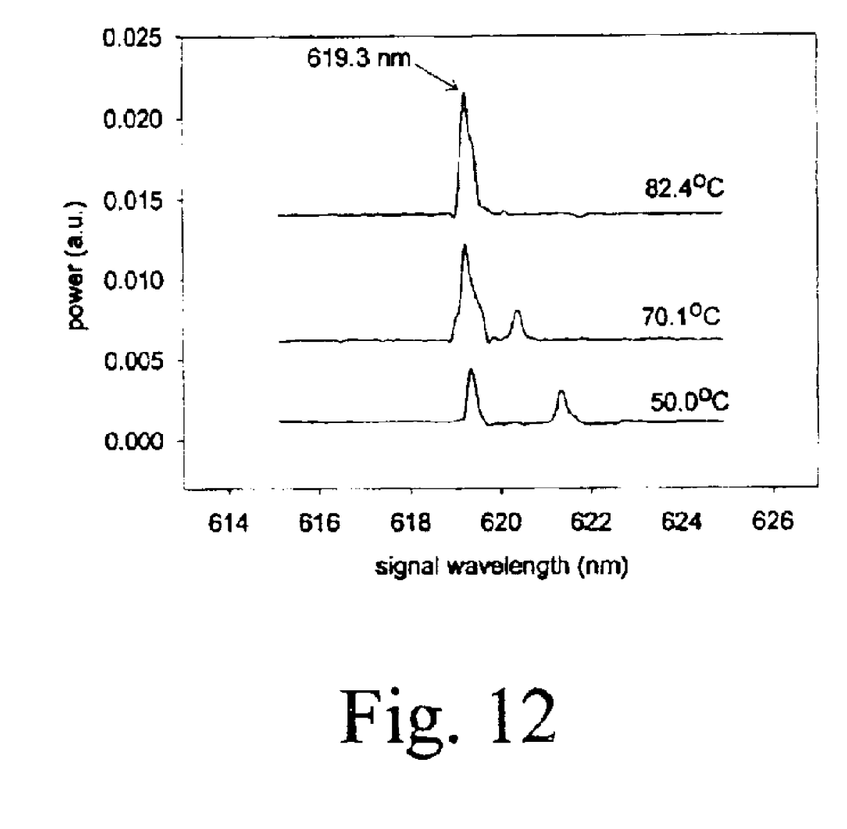
FIG. 12 is the measured signal spectra from the two-photon photorefractive DFB OPO in FIG. 11.

While keeping the 532-nm interference fringes in the PPLN crystal, we illuminated the PPLN +z surface with UV light of the intensity 53 mW/cm$^2$ and observed again the DFB OPO signal at the output. The UV light at the 365-nm wavelength was attenuated along the z direction in the lithium niobate and induced a corrugated DFB structure through the so-called two-photon photorefractive writing scheme (L. Hesselink, et al., Science 282 (1998) pp. 1089). FIG. 12 shows the OPO and OPG signal spectra from the PPLN at different temperatures. It is evident from FIG. 12 that, although the OPG wavelength was tuned by temperature, the DFB OPO signal wavelength at 619.3 nm again remained unchanged due to the photorefractive DFB structure. At 82.4° C., the OPG wavelength overlapped with the OPO signal wavelength. When we translated the pump beam transversely in the −z direction, the DFB OPO signal was reduced gradually due to the spatial variation of the photorefractive DFB structure in the z direction. In this experiment, the DFB OPO signal spectral width was also 3 Å.

Since the photorefractive effect, relying on the electro-optic effect, falls into the category of an electro-optic phenomenon, the experiments mentioned above can be generalized to the electro-optic DFB or DBR structure for use in the OPO of the present invention.

Typically the refractive index change from the photorefractive effect and the electro-optic effect is small compared to the proposed etched or coated DFB or DBR structure. Therefore it is a straightforward generalization from the above experiments that an etched or coated DFB or DBR structure in an OPO nonlinear optical element also falls into the scope of this invention.

What is claimed is:

1. A coherent radiation device for generating laser-like radiation from an OPO that is formed by a dielectric-modulation structure inside a nonlinear optical element for oscillating electromagnetic waves within the bandwidth of said OPO.

2. The coherent radiation device according to claim 1, wherein said dielectric-modulation structure is a DFB structure having a modulation period matching the Bragg condition for establishing single-frequency laser oscillation in said OPO.

3. The coherent radiation device according to claim 1, wherein said dielectric-modulation structure is a DBR structure having a modulation period matching the Bragg condition for establishing narrow-band laser oscillation in said OPO.

4. The coherent radiation device according to claim 1, wherein said dielectric-modulation structure is a chirped modulation structure having a broad-band spatial frequency components matching the Bragg condition for establishing broad-band laser oscillation in said OPO.

5. The coherent radiation device according to claim 1, wherein said dielectric-modulation structure is a cascading structure having multiple modulation periods matching the Bragg condition for establishing multi-wavelength oscillation in said OPO.

6. A coherent radiation device for generating narrow-spectral-width laser-like radiation from an OPO that is formed by a photorefractive DFB structure in a nonlinear optical element for oscillating an electromagnetic wave at one of the parametric mixing wavelengths of said OPO.

7. The coherent radiation device according to claim 6, wherein said OPO has a built-in photorefractive DFB structure in a bulk nonlinear optical crystal.

8. The coherent radiation device according to claim 6, wherein said OPO has a built-in photorefractive DFB structure in a waveguide nonlinear optical crystal.

9. A coherent radiation device for generating narrow-spectral-width laser-like radiation from an OPO that is formed by a photorefractive DBR structure in a nonlinear optical element for oscillating an electromagnetic wave at one of the parametric mixing wavelengths of said OPO.

10. The coherent radiation device according to claim 9, wherein said OPO has a built-in photorefractive DBR structure in a bulk nonlinear optical crystal.

11. The coherent radiation device according to claim 9, wherein said OPO has a built-in photorefractive DBR structure in a waveguide nonlinear optical crystal.

12. The coherent radiation device according to claims 6 or 9, wherein said DFB or said DBR structure has a dielectric-modulation period of $\Lambda_g$ satisfying the Bragg condition $\Lambda_g = m\lambda/2n$, where n is the effective refractive index seen by the Bragg wavelength λ, and m is a positive integer, so that said device oscillates at the wavelength λ.

13. The coherent radiation device according to claims 6 or 9, wherein said Bragg wavelength λ is any of the parametric mixing wavelengths of said OPO.

14. The coherent radiation device according to claims 1, 6 or 9, wherein said nonlinear optical element is a nonlinear optical crystal having second-order nonlinear susceptibility.

15. The coherent radiation device according to claim 14, wherein said second-order nonlinear optical crystal is a birefringence phase-matched crystal.

16. The coherent radiation device according to claim 14, wherein said second-order nonlinear optical crystal is a quasi-phase-matched crystal.

17. The coherent radiation device according to claim 14, wherein said second-order nonlinear optical crystal is a photorefractive nonlinear optical crystal selected from the material group consisting of lithium niobate, lithium tantalite, impurity-doped lithium niobate, and impurity-doped lithium tantalite.

18. A coherent radiation device for generating narrow-spectral-width laser-like radiation from an OPO that is formed by one of the photorefractive DFB and DBR structures in a nonlinear optical element, in which the photorefractive index modulation is fabricated by shining an optical beam through a photomask atop the photorefractive nonlinear optical element.

19. The coherent radiation device according to claim 18, wherein said photomask has a spatial transmission period matching the Bragg condition desirable for said OPO.

20. The coherent radiation device according to claim 18, wherein said optical beam is an optical write beam whose wavelength and intensity have the effect of inducing refractive-index modulation in the nonlinear optical material.

21. The coherent radiation device according to claim 18, wherein said optical beam is at one of visible and UV wavelengths.

22. The coherent radiation device according to claim 18, wherein said nonlinear optical element is a nonlinear optical crystal having second-order nonlinear susceptibility.

23. A coherent radiation device for generating narrow-spectral-width laser-like radiation from an OPO that is formed by one of the photorefractive DFB and DBR structures in a nonlinear optical element, wherein the photorefractive index modulation is fabricated by an interferometric photorefractive writing scheme, with which two crossed laser beams with a proper crossing angle provides spatial optical intensity modulation in a nonlinear optical element through the interference effect.

24. The coherent radiation device according to claim 23, wherein the periodicity of the interference fringes matches the Bragg condition desirable for said OPO.

25. A coherent radiation device for generating narrow-spectral-width laser-like radiation from an OPO that is formed by an electro-optic DFB structure in an electro-optic nonlinear optical element, wherein an spatially varying electric field is applied to said electro-optic nonlinear optical element for spatially modulating the refractive index in the laser propagation direction and the periodicity of said refractive index modulation matches the Bragg condition desirable for said OPO.

26. A coherent radiation device for generating narrow-spectral-width laser-like radiation from an OPO that is formed by an electro-optic DBR structure in an electro-optic nonlinear optical element, wherein a spatially varying electric field is applied to said electro-optic nonlinear optical element for spatially modulating the refractive index in the laser propagation direction and the periodicity of said refractive index modulation matches the Bragg condition desirable for said OPO.

27. A coherent radiation device for generating narrow-spectral-width laser-like radiation from an OPO that is formed by a DFB structure inside an electro-optic nonlinear optical element and atop a nonlinear optical waveguide, with which the distributed optical feedback from the waves near the waveguide surface is sufficient for starting optical parametric oscillation.

28. The coherent radiation device according to claim 27, wherein said DFB structure is fabricated by using schemes selected from the group consisting of material etching, material implantation, thin film coating, micro-lithography, and a combination of the same.

29. A coherent radiation device for generating narrow-spectral-width laser-like radiation from an OPO that is formed by a DBR structure inside an electro-optic nonlinear optical element and atop a nonlinear optical waveguide, with which the distributed optical feedback from the waves near the waveguide surface is sufficient for starting optical parametric oscillation.

30. The coherent radiation device according to claim 29, wherein the DBR structure is fabricated by using schemes selected from the group consisting of material etching, material implantation, thin film coating, micro-lithography, and a combination of the same.

31. A coherent radiation device for generating narrow-spectral-width laser-like radiation from an OPO that is formed by one of the DFB and DBR structures inside a nonlinear optical waveguide, with which an optical feedback from Bragg scattered waves inside a waveguide is sufficient for starting optical parametric oscillation.

32. The coherent radiation device according to claim 31, wherein one of said DFB and DBR structures is of photorefractive type.

33. The coherent radiation device according to claim 31, wherein one of said DFB and DBR structures is of electro-optic type.

* * * * *

UNITED STATES PATENT AND TRADEMARK OFFICE
CERTIFICATE OF CORRECTION

PATENT NO. : 6,904,066 B2
DATED : June 7, 2005
INVENTOR(S) : Huang et al.

It is certified that error appears in the above-identified patent and that said Letters Patent is hereby corrected as shown below:

Title page, Item [54] and Column 1, line 1,
Title, delete the title in its entirety and insert the following new title
-- AN OPTICAL PARAMETRIC OSCILLATOR FORMED BY A DIELECTRIC-MODULATION STRUCTURE IN A NONLINEAR OPTICAL MATERIAL --.

Drawings,
Sheet 11 of 12, above Figure 11, delete the caption "Figure 10".

Column 1,
Line 25, after the word "where", delete "$_n$" and insert therefor -- n --.

Column 2,
Line 47, delete "$\lambda = h2n\Lambda_g$" and insert therefor -- $\lambda = 2n\Lambda_g$ --.

Column 7,
Line 11, after the word "of", delete "$\Delta_n$" and insert therefor -- $\Delta n$ --.

Signed and Sealed this

Twenty-second Day of November, 2005

JON W. DUDAS
*Director of the United States Patent and Trademark Office*